United States Patent
Rasimas et al.

(10) Patent No.: US 7,095,736 B1
(45) Date of Patent: Aug. 22, 2006

(54) SYSTEM, DEVICE, AND METHOD FOR LOCALIZED INFORMATION PROCESSING IN A MULTIPROTOCOL LABEL SWITCHING NETWORK

(75) Inventors: Jennifer G. Rasimas, Morrisville, NC (US); Stephen S. Jackson, Chapel Hill, NC (US); Ottis K. Black, Raleigh, NC (US)

(73) Assignee: Nortel Networks Limited, (CA)

( * ) Notice: Subject to any disclaimer, the term of this patent is extended or adjusted under 35 U.S.C. 154(b) by 1048 days.

(21) Appl. No.: 09/954,136

(22) Filed: Sep. 17, 2001

(51) Int. Cl.
*H04J 12/56* (2006.01)
(52) U.S. Cl. .................. 370/389; 370/466; 370/400
(58) Field of Classification Search ............... None
See application file for complete search history.

(56) References Cited

U.S. PATENT DOCUMENTS

| | | | | |
|---|---|---|---|---|
| 5,991,300 A | * | 11/1999 | Tappan | 370/392 |
| 6,295,296 B1 | * | 9/2001 | Tappan | 370/392 |
| 6,330,614 B1 | * | 12/2001 | Aggarwal et al. | 709/236 |
| 6,526,056 B1 | * | 2/2003 | Rekhter et al. | 370/392 |
| 2002/0003797 A1 | * | 1/2002 | Rautenberg | 370/389 |
| 2002/0109879 A1 | * | 8/2002 | Wing So | 359/118 |

OTHER PUBLICATIONS

Memo: "Multiprotocol Label Switching Architecture", Rosen, et al., Network Working Group, RFC 3031, Jan. 2001.
Memo: "MPLS Label Stack Encoding", Rosen, et al., Network Working Group, RFC 3032, Jan. 2001.
Memo: "LDP Specification", Andersson, et al., Network Working Group, RFC 3036, Jan. 2001.

* cited by examiner

*Primary Examiner*—Bob A. Phunkulh
(74) *Attorney, Agent, or Firm*—McGuinness & Manaras LLP (57) ABSTRACT

A system, device, and method for localized information processing in a multiprotocol label switching network enables one or more intermediate devices to process locally significant information in certain packets. Each locally significant packet includes a local significance indicator and optionally includes a processed indicator indicating whether or not the packet has been locally processed. A designated intermediate device decides whether to locally process the packet based upon the local significance indicator and optionally the processed indicator.

21 Claims, 6 Drawing Sheets

```
+-+-+-+-+-+-+-+-+-+-+-+-+-+-+-+-+-+-+-+-+-+-+-+-+-+-+-+-+-+-+-+-+
+                                                               +
|                       Label Header                            |  - 110
+                                                               +
+-+-+-+-+-+-+-+-+-+-+-+-+-+-+-+-+-+-+-+-+-+-+-+-+-+-+-+-+-+-+-+-+
+                                                               +
|                       Packet Contents                         |  - 120
+                                                               +
+-+-+-+-+-+-+-+-+-+-+-+-+-+-+-+-+-+-+-+-+-+-+-+-+-+-+-+-+-+-+-+-+
```

FIG. 1    100

```
         210                        220 230      240
          |                          |   |        |
+-+-+-+-+-+-+-+-+-+-+-+-+-+-+-+-+-+-+-+-+-+-+-+-+-+-+-+-+-+-+-+
|             Label                 |X X X|S|    TTL          |
+-+-+-+-+-+-+-+-+-+-+-+-+-+-+-+-+-+-+-+-+-+-+-+-+-+-+-+-+-+-+-+
```

FIG. 2    200

```
         210                        220 230      240
          |                          |   |        |
+-+-+-+-+-+-+-+-+-+-+-+-+-+-+-+-+-+-+-+-+-+-+-+-+-+-+-+-+-+-+-+
|             Label                 |1 1 1|S|    TTL          |
+-+-+-+-+-+-+-+-+-+-+-+-+-+-+-+-+-+-+-+-+-+-+-+-+-+-+-+-+-+-+-+
```

FIG. 3    300

```
         210                      410 220 230    240
          |                         )  |  (       |
+-+-+-+-+-+-+-+-+-+-+-+-+-+-+-+-+-+-+-+-+-+-+-+-+-+-+-+-+-+-+-+
|             Label                 |L|X X|S|    TTL          |
+-+-+-+-+-+-+-+-+-+-+-+-+-+-+-+-+-+-+-+-+-+-+-+-+-+-+-+-+-+-+-+
```

```
+-+-+-+-+-+-+-+-+-+-+-+-+-+-+-+-+-+-+-+-+-+-+-+-+-+-+-+-+-+-+-+-+
|             Label                  |X X X|S|     TTL           | - 1110
+-+-+-+-+-+-+-+-+-+-+-+-+-+-+-+-+-+-+-+-+-+-+-+-+-+-+-+-+-+-+-+-+
|               Local Significance Indicator(s)                  | - 1120
+-+-+-+-+-+-+-+-+-+-+-+-+-+-+-+-+-+-+-+-+-+-+-+-+-+-+-+-+-+-+-+-+
```

FIG. 11    <u>1100</u>

```
+-+-+-+-+-+-+-+-+-+-+-+-+-+-+-+-+-+-+-+-+-+-+-+-+-+-+-+-+-+-+-+-+
+                                                                +
|                       Label Header                             | - 1210
+                                                                +
+-+-+-+-+-+-+-+-+-+-+-+-+-+-+-+-+-+-+-+-+-+-+-+-+-+-+-+-+-+-+-+-+
+                                                                +
|              Local Significance Indicator(s)                   | - 1220
+                                                                +
+-+-+-+-+-+-+-+-+-+-+-+-+-+-+-+-+-+-+-+-+-+-+-+-+-+-+-+-+-+-+-+-+
+                                                                +
|                      Packet Contents                           | - 1230
+                                                                +
+-+-+-+-+-+-+-+-+-+-+-+-+-+-+-+-+-+-+-+-+-+-+-+-+-+-+-+-+-+-+-+-+
```

FIG. 12    <u>1200</u>

SYSTEM, DEVICE, AND METHOD FOR LOCALIZED INFORMATION PROCESSING IN A MULTIPROTOCOL LABEL SWITCHING NETWORK

FIELD OF THE INVENTION

The present invention relates generally to multiprotocol label switching (MPLS), and more particularly to localized processing of label switched information in a MPLS network.

BACKGROUND OF THE INVENTION

In today's information age, communication devices, such as computers and computer peripherals, are often internetworked over a communication network. A common networking model routes packets of information within the communication network using a networking protocol such as the Internet Protocol (IP) or other network layer protocol. Some networking protocols, such as IP, are considered to be "connectionless" networking protocols. In a connectionless networking protocol, each packet of information includes a network layer address, and each router forwards the packet of information based upon the network layer address according to predetermined signaling and routing protocols, such as the Open Shortest Path First (OSPF) protocol, the Routing Information Protocol (RIP), Hello, Border Gateway Protocol (BGP), RSVP, or other routing protocol.

Thus, each router makes an independent forwarding decision for the packet based upon the network layer address. Essentially, each router partitions the entire set of network layer addresses into a number of Forwarding Equivalence Classes (FECs), and each FEC is mapped to a particular outgoing path (or set of paths, in the case of multi-path routing) based upon the routing protocol. The router determines an FEC for each packet of information based upon the network layer address of the packet, and forwards the packet of information to the corresponding outgoing path (or set of paths).

Network layer routing requires each router to process each packet of information at the network layer. This is an expensive and time-consuming operation that limits the performance of some routers and even prevents certain devices that do not support the networking protocol from performing routing and other functions on the packets.

Label switching can be used to eliminate the network layer processing by certain devices in the communication network. Label switching enables a packet to be transported across a network domain (referred to hereinafter as an "autonomous system" or "AS") using labels rather than the network layer address. Specifically, a label switched path (LSP) is established from an ingress point border device to an egress point border device in the AS. The LSP traverses a number of intermediate label switching devices. When the packet enters the ingress point border device, the ingress point border device uses the network address to assign the packet to a particular FEC, and inserts the corresponding label into the packet, specifically within a label header. Each intermediate label switching device along the LSP forwards the packet based upon the label. The egress point border device removes the label from the packet and forwards the packet based upon the network address. Thus, only the border devices process the packet at the network layer, while the intermediate devices process the packet based upon the label only.

In order to establish and remove LSPs, the various label switching devices exchange label switching information using a signaling protocol. Label switching information can be exchanged using a dedicated label distribution protocol, or can be exchanged ("piggy-backed") in other signaling and routing protocols, such as OSPF, IS-IS, and RIP.

Each label switching device maintains mapping information for mapping each FEC to a corresponding label. The label mapping information is typically maintained in the various forwarding/routing tables maintained by the label switching device. It is common for the label switching device to maintain a forwarding table for each incoming interface and a forwarding table for each outgoing interface. The label mapping information maintained by the label switching device in the incoming forwarding tables enables the label switching device to quickly forward received packets that include label switching information. The label mapping information maintained by the label switching device in the outgoing forwarding tables enables the label switching device to insert label switching information into packets. For convenience, a forwarding table that includes label mapping information may be referred to as a label information base (LIB).

An architecture for multi-protocol label switching (MPLS) is discussed in E. Rosen et. al., Multiprotocol Label Switching Architecture, Internet Engineering Task Force (IETF) Request For Comments (RFC) 3031, January 2001, which is hereby incorporated herein by reference in its entirety. One signaling protocol for exchanging label switching information for MPLS is commonly known as the Label Distribution Protocol (LDP). LDP is described in L. Andersson et. al., LDP Specification, Internet Engineering Task Force (IETF) Request For Comments (RFC) 3036, January 2001, which is hereby incorporated herein by reference in its entirety. An encoding technique for producing and processing labeled packets for MPLS is described in E. Rosen et. al., MPLS Label Stack Encoding, Internet Engineering Task Force (IETF) Request For Comments (RFC) 3032, January 2001, which is hereby incorporated herein by reference in its entirety.

SUMMARY OF THE INVENTION

In accordance with one aspect of the invention, a system, device, and method for localized information processing in a multiprotocol label switching network enables one or more intermediate devices to process locally significant information in certain packets. Each locally significant packet includes a local significance indicator and optionally includes a processed indicator indicating whether or not the packet has been locally processed. A designated intermediate device decides whether to locally process the packet based upon the local significance indicator and optionally the processed indicator.

DETAILED DESCRIPTION OF A PREFERRED EMBODIMENT

As discussed above, a label switched path (LSP) may be established between two label switching routers (LSRs). Each label switched packet includes a label header including at least one label. Intermediate devices between the LSRs forward each packet based upon the label in the label header rather than network layer addressing information.

Figure 1:
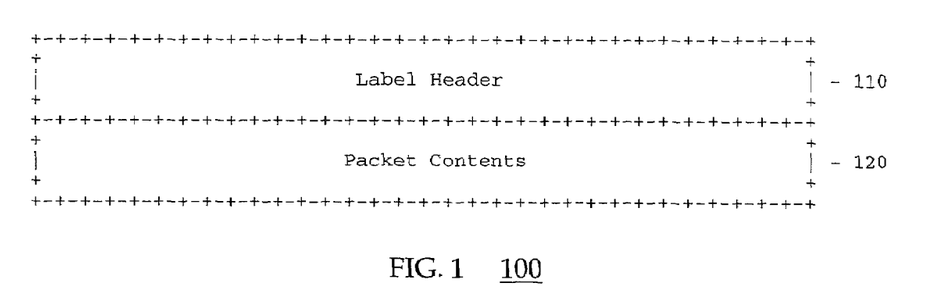
FIG. 1 is a block diagram showing the format of a label switched packet in accordance with an embodiment of the present invention.

FIG. 1 is a block diagram showing the format of a label switched packet 100. Among other things, the label switched packet includes a label header 110 and packet contents 120.

Figure 2:
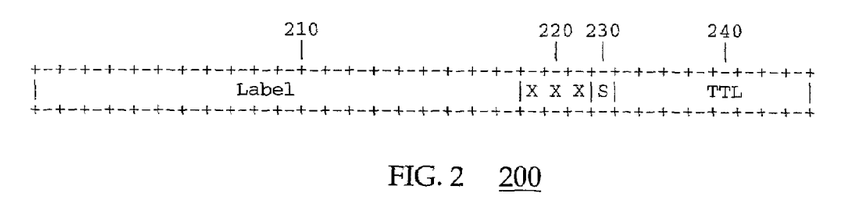
FIG. 2 is a block diagram showing the format of a label in accordance with an embodiment of the present invention.

FIG. 2 is a block diagram showing the format of a label 200 in accordance with the document entitled MPLS Label Stack Encoding, which was incorporated by reference above. Among other things, the label 200 includes a label field 210, an experimental (X) field 220, a bottom-of-stack (S) field 230, and a time-to-live (TTL) field 240. The label field 210 includes a 20-bit label value. The S field 230 indicates whether or not the label 200 is at the bottom of a label stack within the label header 110. The TTL field 240 includes a time-to-live value. The X field 220 includes bits that are reserved for future uses.

It is sometimes necessary or desirable for an intermediate device to intercept a label switched packet for local processing by the intermediate device. For example, certain types of management and control information have local significance, and one or more intermediate devices can be designated to process this locally significant information. The intermediate device may process the locally significant information with or without forwarding the packet.

Therefore, each locally significant packet includes an indicator that allows the designated intermediate device(s) to identify the locally significant packet. For convenience, this indicator is referred to hereinafter as the local (L) indicator. The present invention is not limited to any particular type of L indicator, although the L indicator preferably does not interfere with normal label switching by intermediate devices that do not explicitly support label switched packets including the L indicator. Thus, an intermediate device that does not explicitly support label switched packets including the L indicator simply forwards the packet based upon the label and ignores the L indicator, and the L indicator does not interfere with this label switching function.

In various embodiments of the present invention, some or all of the X field 220 bits are used for the L indicator.

In one exemplary embodiment of the present invention, the entire X field 220 is used as the L indicator. Specifically, a predetermined 3-bit L indicator value is used in the X field 220 to indicate that the packet contains locally significant information. Because reserved bits are usually set to zero, the 3-bit L indicator value is preferably a non-zero value (i.e., at least one of the bits is a one).

Figure 3:
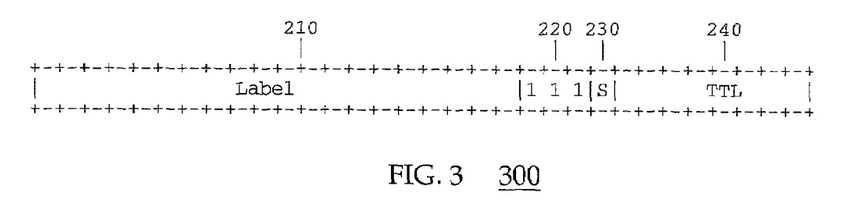
FIG. 3 shows an exemplary label in which the experimental field is set to a 3-bit local indicator value of all ones (i.e., '111') in accordance with an embodiment of the present invention.

FIG. 3 shows an exemplary label 300 in which the X field 220 is set to a 3-bit L indicator value of all ones (i.e., '111').

In another exemplary embodiment of the present invention, a single X field 220 bit is used as the L indicator.

Figure 4:
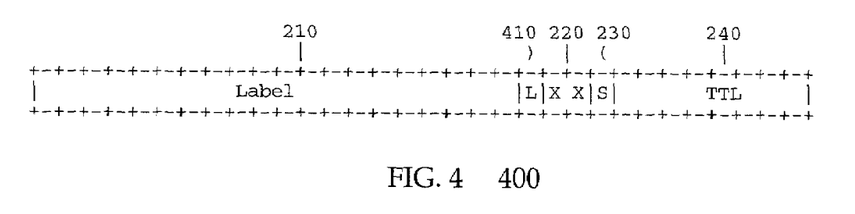
FIG. 4 shows an exemplary label in which the 3-bit experimental field is divided into a 1-bit local indicator field and a 2-bit experimental field in accordance with an embodiment of the present invention.

FIG. 4 shows an exemplary label 400 in which the 3-bit X field is divided into a 1-bit L indicator field 410 and a 2-bit X field 220. Because reserved bits are usually set to zero, the L indicator field 410 is preferably set to one to indicate that the packet contains locally significant information.

In addition to the L indicator, the locally significant packet may also include an indicator for indicating that at least one intermediate device has locally processed the locally significant packet. For convenience, this indicator is referred to hereinafter as the processed (P) indicator. The first intermediate device to process the packet sets the P indicator. Subsequent intermediate devices that are designated to process the packet may or may not process the packet. The present invention is not limited to any particular type of P indicator, although the P indicator preferably does not interfere with normal label switching by intermediate devices that do not explicitly support label switched packets including the P indicator. Thus, an intermediate device that does not explicitly support label switched packets including the P indicator simply forwards the packet based upon the label and ignores the P indicator, and the P indicator does not interfere with this label switching function.

Figure 5:
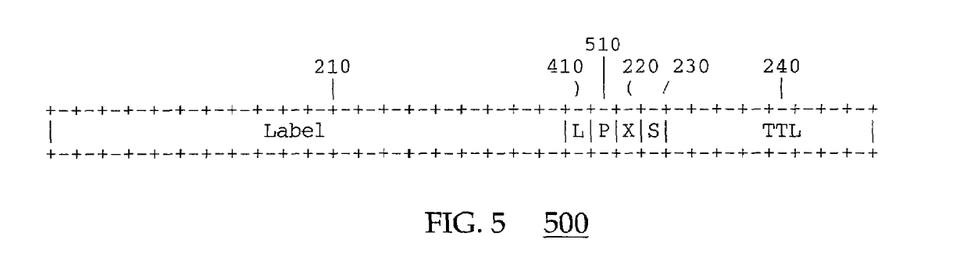
FIG. 5 shows an exemplary label in which the 3-bit experimental field is divided into a 1-bit local indicator field, a 1-bit processed indicator field, and a 1-bit experimental field in accordance with an embodiment of the present invention.

FIG. 5 shows an exemplary label 500 in which the 3-bit X field is divided into a 1-bit L indicator field 410, a 1-bit P indicator field 510, and a 1-bit X field 220. Because reserved bits are usually set to zero, the P indicator field 510 is preferably set to one to indicate that the packet has been processed.

When a locally significant label switched packet is transmitted, the L indicator is typically set to indicate that the packet is locally significant and the P indicator (if any) is set to indicate that the packet has not been locally processed.

Figure 6:
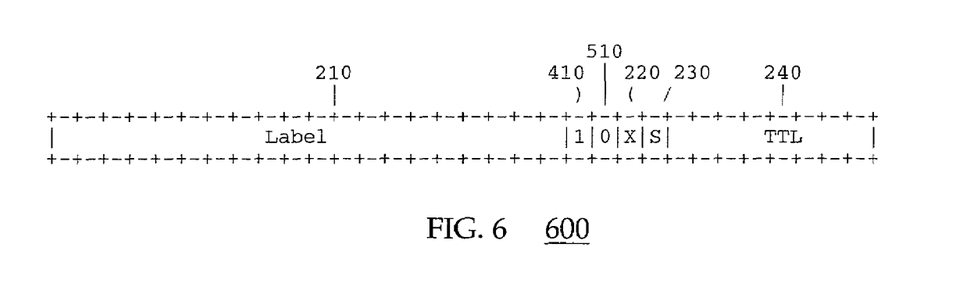
FIG. 6 shows an exemplary label in which the local indicator field is set to one to indicate that the packet is locally significant and the processed indicator field is set to zero to indicate that the packet has not been locally processed in accordance with an embodiment of the present invention.

FIG. 6 shows an exemplary label 600 in which the L indicator field 410 is set to one to indicate that the packet is locally significant and the P indicator field 510 is set to zero to indicate that the packet has not been locally processed.

When a designated intermediate device processes the packet, the intermediate device sets the P indicator (if any) to indicate that the packet has been locally processed.

Figure 7:
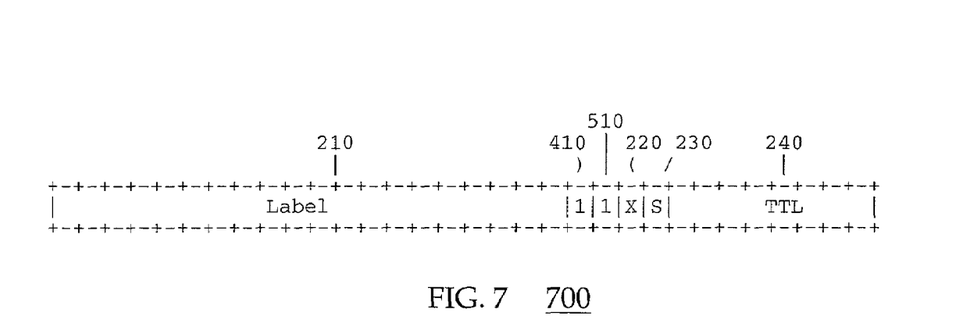
FIG. 7 shows an exemplary label in which the local indicator field is set to one to indicate that the packet is locally significant and the processed indicator field is set to one to indicate that the packet has been locally processed in accordance with an embodiment of the present invention.

FIG. 7 shows an exemplary label 700 in which the L indicator field 410 is set to one to indicate that the packet is locally significant and the P indicator field 510 is set to one to indicate that the packet has been locally processed.

It should be noted that the local significance indicator(s) are not required to be within the label at the top of a label stack.

Figure 11:
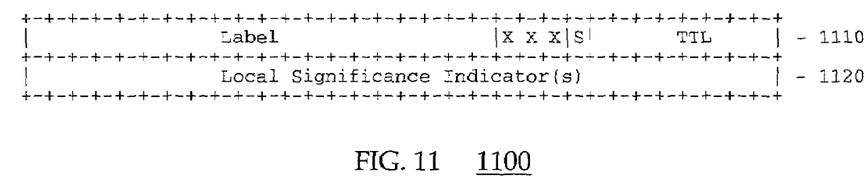
FIG. 11 is a block diagram showing an exemplary packet including a label stack including a label and local significance indicator(s) in accordance with an embodiment of the present invention.

FIG. 11 is a block diagram showing an exemplary packet 1100 including a label stack having a label 1110 and local significance indicator(s) 1120. An intermediate device that supports local significance indicators looks past the top label 1110 to find the local significance indicator(s) 1120. An intermediate device that does not support local significance indicators simply forwards the packet based upon the top label 1110, and is unaware that the local significance indicator(s) 1120 are even in the label header.

It should be noted that the local significance indicator(s) are not even required to be within the label stack.

Figure 12:
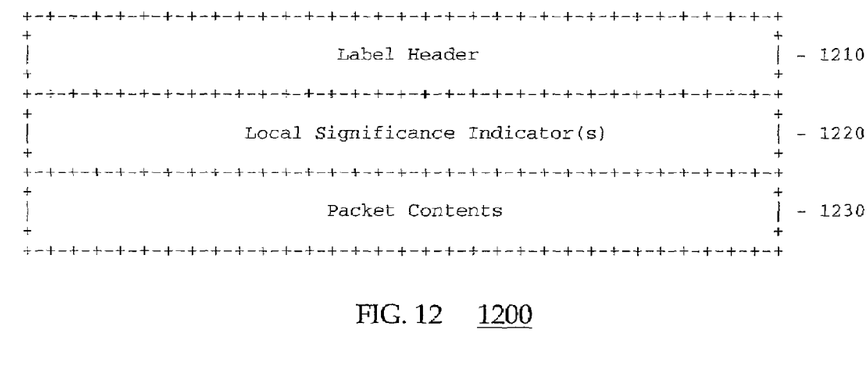
FIG. 12 is a block diagram showing an exemplary packet including a label header, local significance indicator(s), and packet contents in accordance with an embodiment of the present invention.

FIG. 12 is a block diagram showing an exemplary packet 1200 including a label header 1210, local significance indicator(s) 1220, and packet contents 1230. In this arrangement, the local significance indicator(s) 1220 are outside and below the label header 1210. An intermediate device that supports local significance indicators looks past the label header 1210 to find the local significance indicator(s) 1220. An intermediate device that does not support local significance indicators simply forwards the packet based upon the label header 1210, and is unaware that the local significance indicator(s) 1220 are even in the packet 1200.

Figure 8:
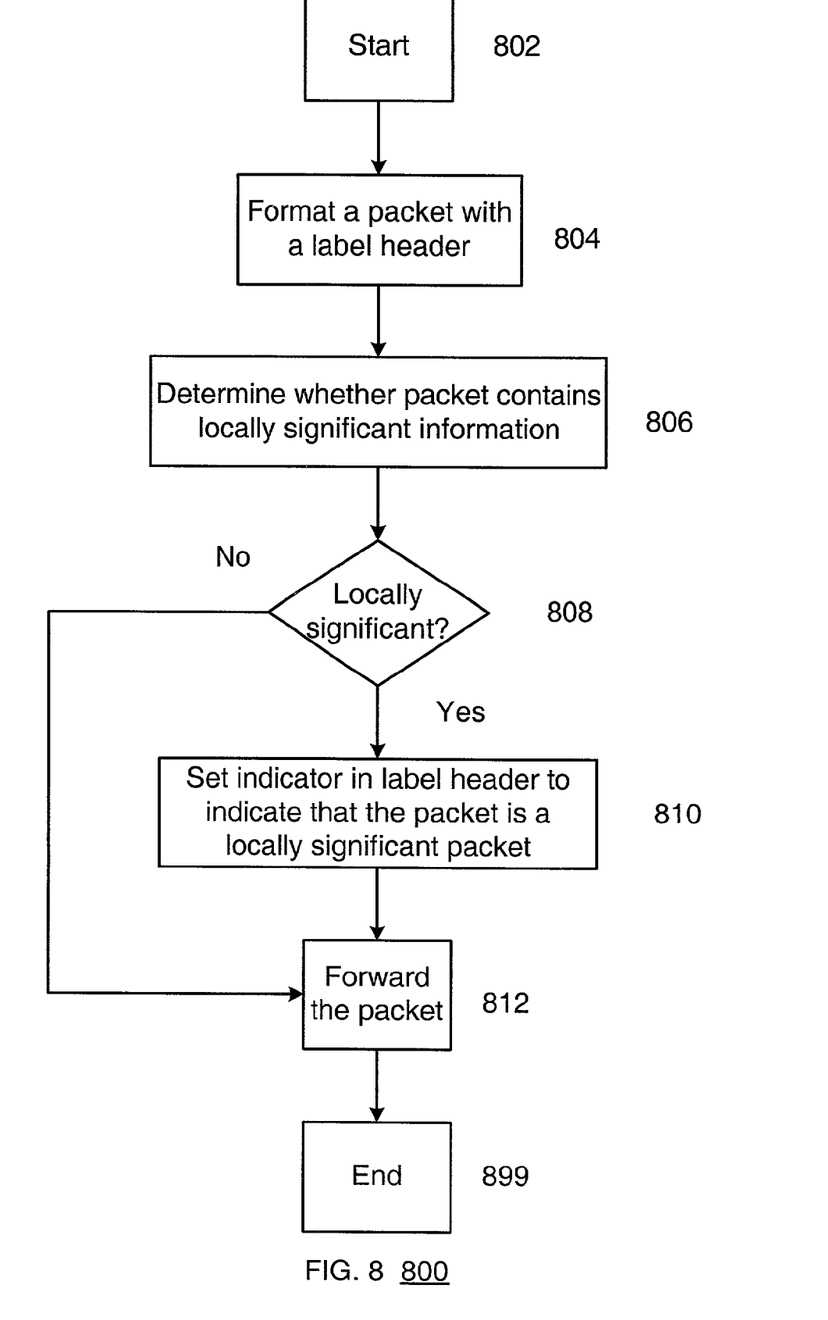
FIG. 8 is a logic flow diagram showing exemplary logic for transmitting a label switched packet in accordance with an embodiment of the present invention.

FIG. 8 is a logic flow diagram showing exemplary logic 800 for transmitting a label switched packet in accordance with an embodiment of the present invention. Beginning at block 802, the logic formats a packet with a label header, in block 804. The logic determines whether the packet contains locally significant information, in block 806. If the packet contains locally significant information (YES in block 808), then the logic sets the indicator in the label header to indicate that the packet is a locally significant packet, in block 810. If the packet does not contain locally significant information (NO in block 808), then the logic does not set the indicator in the label header to indicate that the packet is a locally significant packet. The logic forwards the packet, in block 812. The logic 800 terminates in block 899.

Figure 9:
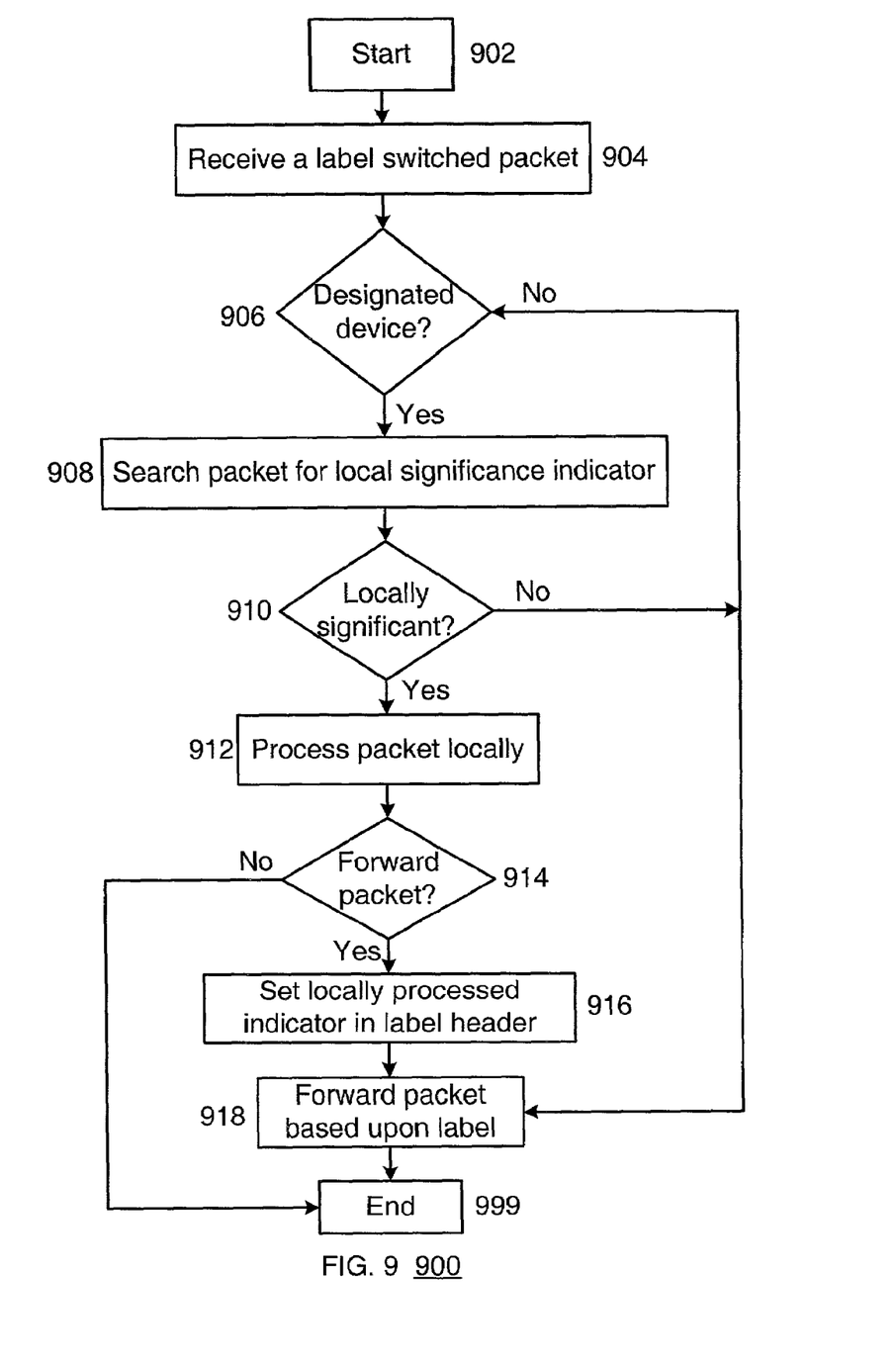
FIG. 9 is a logic flow diagram showing exemplary logic for processing a label switched packet by an intermediate device in accordance with an embodiment of the present invention in which the intermediate device ignores any processed indicator field in the packet.

FIG. 9 is a logic flow diagram showing exemplary logic 900 for processing a label switched packet by an intermediate device in accordance with an embodiment of the present invention. Beginning in block 902, the logic receives a label switched packet, in block 904. If the intermediate device is not designated for locally processing packets (NO in block 906), then the logic proceeds to forward the packet based upon the label, in block 918. If the intermediate device is designated for locally processing packets (YES in block 906), then the logic searches the packet for a local significance indicator to determine whether or not the packet is a locally significant packet, in block 908. If the packet is not a locally significant packet (NO in block 910), then the logic proceeds to forward the packet based upon the label, in block 918. If the packet is a locally significant packet (YES in block 910), then the logic processes the packet locally, in block 912, and decides whether to forward the packet, in block 914. If the logic decides to forward the packet (YES in block 914), then the logic optionally sets the locally processed indicator in the label header, in block 916, and forwards the packet based upon the label, in block 918. The logic 900 terminates in block 999. It should be noted that the logic 900 ignores any P indicator such that the logic locally processes the packet whether or not the packet had already been processed by another intermediate device.

Figure 10:
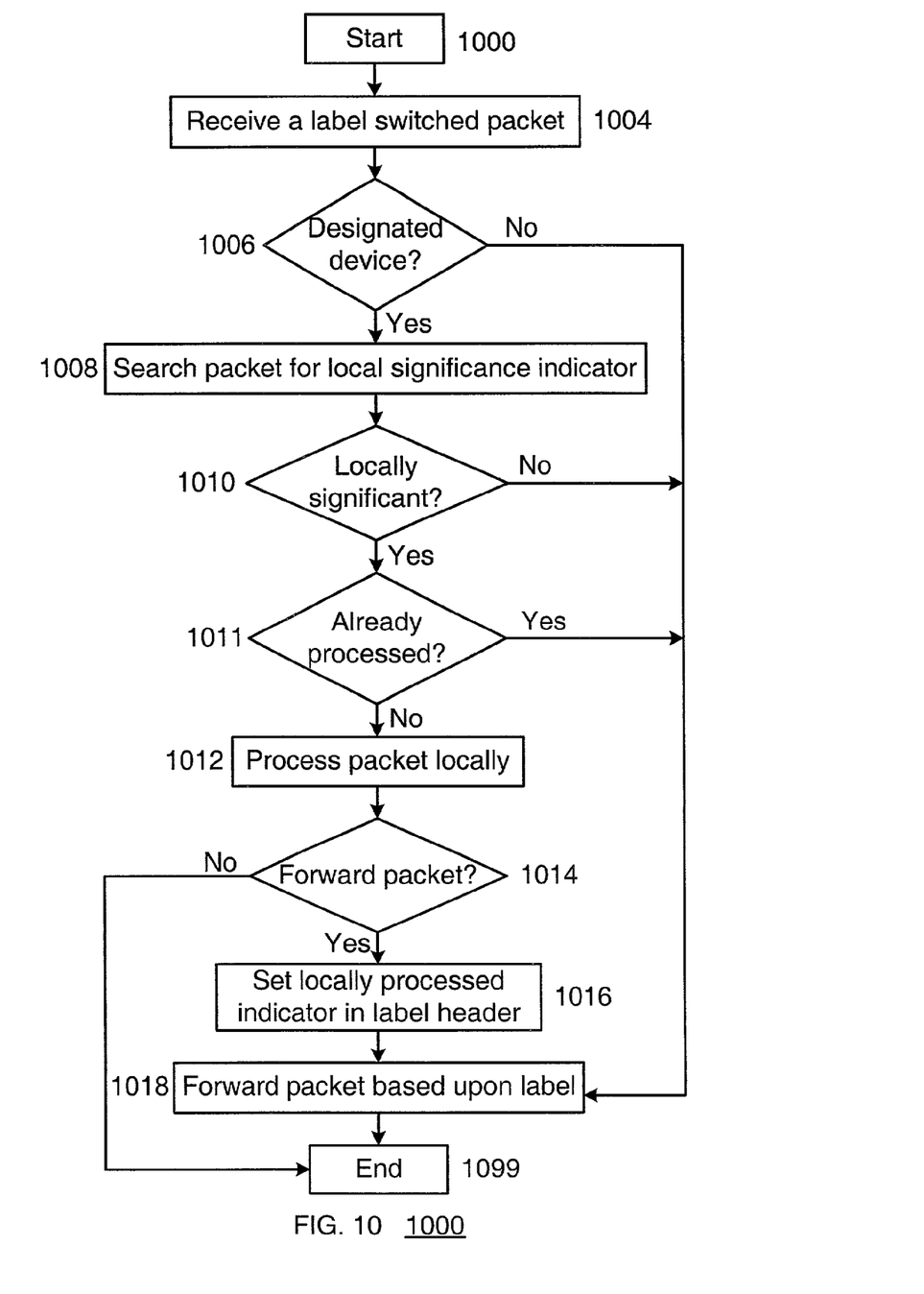
FIG. 10 is a logic flow diagram showing exemplary logic for processing a label switched packet by an intermediate device in accordance with an embodiment of the present invention in which the intermediate device only processes the packet if the packet was not processed by another intermediate device.

FIG. 10 is a logic flow diagram showing exemplary logic 1000 for processing a label switched packet by an intermediate device in accordance with an embodiment of the present invention. Beginning in block 1002, the logic receives a label switched packet, in block 1004. If the intermediate device is not designated for locally processing packets (NO in block 1006), then the logic proceeds to forward the packet based upon the label, in block 1018. If the intermediate device is designated for locally processing packets (YES in block 1006), then the logic searches the packet for a local significance indicator to determine whether or not the packet is a locally significant packet, in block 1008. If the packet is not a locally significant packet (NO in block 1010), then the logic proceeds to forward the packet based upon the label, in block 1018. If the packet is a locally significant packet (YES in block 1010), then the logic determines whether the packet has already been processed, in block 1011. If the packet has already been processed (YES in block 1011), then the logic typically proceeds to forward the packet based upon the label, in block 1018. If the packet has not already been processed (NO in block 1011), then the logic processes the packet locally, in block 1012, and decides whether to forward the packet, in block 1014. If the logic decides to forward the packet (YES in block 1014), then the logic optionally sets the locally processed indicator in the label header, in block 1016, and forwards the packet based upon the label, in block 1018. The logic 1000 terminates in block 1099. It should be noted that the logic 1000 only processes the packet if the packet had not already been processed by another intermediate device.

It should be noted that local processing by the intermediate device(s) can include any type of processing including, but in no way limited to, storing the information, forwarding the information, and displaying the information, to name but a few.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within the intermediate device under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. method for localized information processing by an intermediate device in a multiprotocol label switching network, the method comprising:

receiving a label switched packet including a label having a label field and at least one local significance indicator, the local significance indicator indicating that the packet contains locally significant information other than the label field; and deciding whether to locally process the locally significant information based upon the at least one local significance indicator.

2. The method of claim 1, wherein the label switched packet includes a label header, and wherein the at least one local significance indicator is within the label header.

3. The method of claim 2, wherein the label header includes a label, and wherein the at least one local significance indicator is within the label.

4. The method of claim 3, wherein the label includes an experimental field, and wherein the at least one local significance indicator comprises a predetermined value within the experimental field.

5. The method of claim 3, wherein the label includes an experimental field, and wherein the at least one local significance indicator comprises one bit within the experimental field.

6. The method of claim 2, wherein the label header includes a label, and wherein the at least one local significance indicator is outside of the label.

7. The method of claim 1, wherein the label switched packet includes a label header, and wherein the at least one local significance indicator is outside of the label header.

8. The method of claim 1, further comprising: locally processing the locally significant information.

9. The method of claim 1, wherein the at least one local significance indicator includes a processed indicator indicating that the locally significant information was previously processed by another intermediate device, and wherein deciding whether to locally process the locally significant information based upon the at least one local significance indicator comprises:

deciding to refrain from locally processing the locally significant information based upon the processed indicator.

10. The method of claim 1, further comprising:
setting a processed indicator in the label switched packet; and forwarding the label switched packet.

11. A device for localized information processing in a multiprotocol label switching network, the device comprising:
receiving logic operably coupled to receive a label switched packet including a label having a label field and at least one local significance indicator, the local significance indicator indicating that the packet contains locally significant information other than the label field; and
decision logic operably coupled to decide whether to locally process the locally significant information based upon the at least one local significance indicator.

12. The device of claim 11, wherein the label switched packet includes a label header, and wherein the at least one local significance indicator is within the label header.

13. The device of claim 12, wherein the label header includes a label, and wherein the at least one local significance indicator is within the label.

14. The device of claim 13, wherein the label includes an experimental field, and wherein the at least one local significance indicator comprises a predetermined value within the experimental field.

15. The device of claim 13, wherein the label includes an experimental field, and wherein the at least one local significance indicator comprises one bit within the experimental field.

16. The device of claim 12, wherein the label header includes a label, and wherein the at least one local significance indicator is outside of the label.

17. The device of claim 11, wherein the label switched packet includes a label header, and wherein the at least one local significance indicator is outside of the label header.

18. The device of claim 11, further comprising: processing logic operably coupled to locally process the locally significant information.

19. The device of claim 11, wherein the at least one local significance indicator includes a processed indicator indicating that the locally significant information was previously processed by another intermediate device/and wherein the decision logic is operably coupled to refrain from locally processing the locally significant information based upon the processed indicator.

20. The device of claim 11, further comprising:
forwarding logic operably coupled to set a processed indicator in the label switched packet and forward the labeled switched packet.

21. A communication system comprising a plurality of label switching devices, wherein at least one label switching device is designated to process locally significant label switched packets based upon at least one local significance indicator in each of said locally significant label switched packets, the local significance indicator being indicative of locally significant information other than a label field.

* * * * *